(No Model.)

J. F. ADAMS.
CHURN.

No. 448,491. Patented Mar. 17, 1891.

WITNESSES:
John H. Deemer
C. Sedgwick

INVENTOR:
J. F. Adams
BY
Munn & Co
ATTORNEYS

THE NORRIS PETERS CO., PHOTO-LITHO., WASHINGTON, D. C.

UNITED STATES PATENT OFFICE.

JOHN FRANKLIN ADAMS, OF ALEDO, ILLINOIS.

CHURN.

SPECIFICATION forming part of Letters Patent No. 448,491, dated March 17, 1891.

Application filed September 24, 1890. Serial No. 365,951. (No model.)

*To all whom it may concern:*

Be it known that I, JOHN FRANKLIN ADAMS, of Aledo, in the county of Mercer and State of Illinois, have invented a new and useful Churn, of which the following is a full, clear, and exact description.

This invention relates to improvements in churns of the vertically-reciprocating-dasher type, and has for its objects to provide a simple and inexpensive device of the character named which will be efficient in operation and contain means for regulating the temperature of the contents of the churn while in use, and also for ascertaining the exact temperature of the cream within the churn during the churning process.

To these ends my invention consists in the construction and combination of parts, as hereinafter described and claimed.

Reference is to be had to the accompanying drawings, forming a part of this specification, in which similar letters of reference indicate corresponding parts in both the figures.

Figure 1:
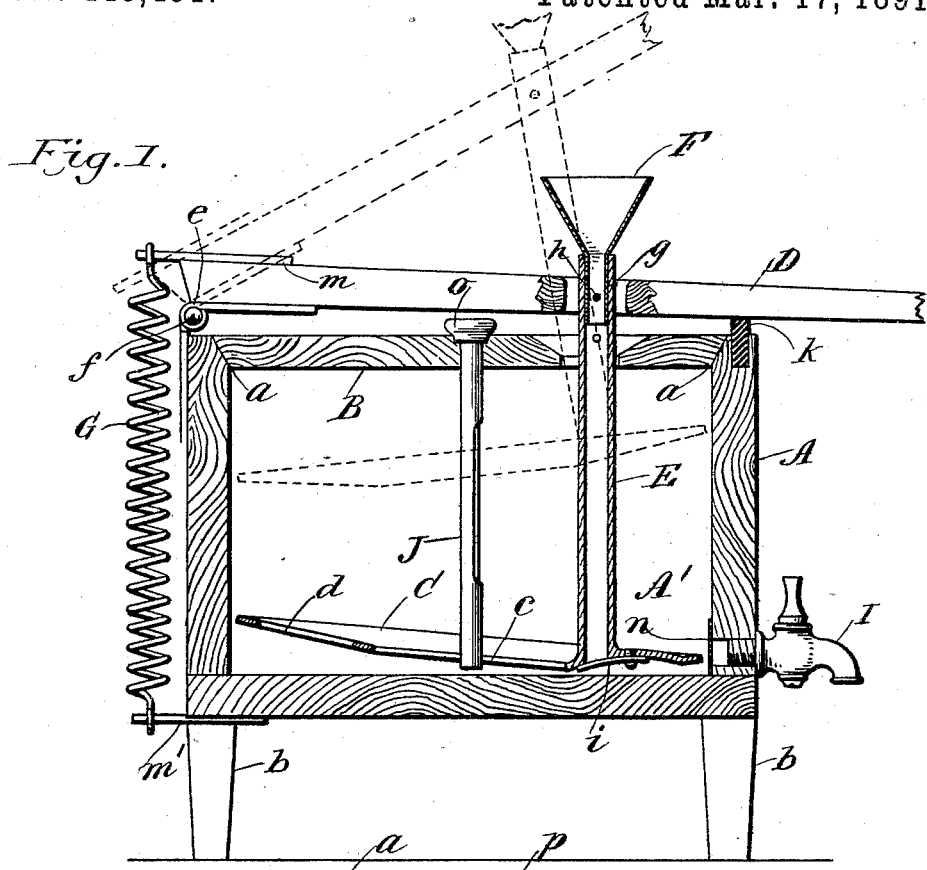
Figure 2:
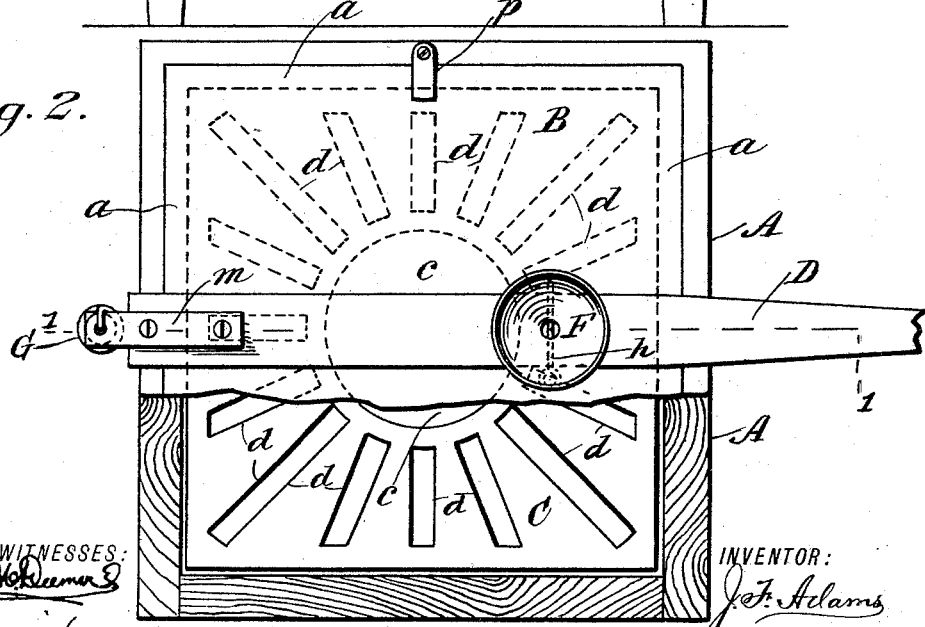

Figure 1 is a side elevation in section taken on the line 1 1 in Fig. 2, the handle being broken, and the elevated adjustment of the working parts shown by dotted lines; and Fig. 2 is a plan view of the device, the end of the handle broken and the lid of the churn-box partly removed.

The cream-receptacle or churn-body A is preferably made of wood, in rectangular form, other shapes being admissible, the dimensions of the body being proportioned to the desired capacity of the churn. A flat lid B is provided, which is beveled on the edges $a$, removing the material to adapt the lid to fit closely in a flaring seat formed at the upper edge of the churn-body A, which latter is supported at a proper height upon four legs $b$, that are secured to the bottom wall of the body A near its corners.

Within the cream-chamber A', afforded by the rectangular body A, a dasher-plate C, made of wood or metal, is located. This portion C of the churn is preferably made of sheet metal of proper thickness to afford stability, and is peripherally shaped to correspond with the interior dimensions and form of the cream-chamber, in which it loosely fits free to reciprocate vertically. The dasher C is centrally apertured, as at $c$, said orifice having a size that is proportioned to the dimensions of the churn, and is designed to permit cream or other liquid in the churn to rapidly pass from the lower side to the upper side of the dasher through this hole. The central aperture $c$ is also of advantage, to permit the suspension of a thermometer within the mass of cream in the churn while the latter is in operation, as will be further mentioned.

As shown in Fig. 1, the dasher C is dished slightly from the outer edges inwardly to the aperture $c$, and in this annular inwardly-sloping wall a series of radial slots $d$ are formed, which extend from points equally distant from the margin of the aperture $c$ toward the outer edge of the dasher, leaving integral connecting and supporting portions at each end of said slots.

The actuating-lever D is hinge-jointed at $e$ to the wall of the churn-body at its rear side, and, preferably, the pintle $f$ is made removable to allow the lever to be disconnected. At $g$ the lever D is vertically perforated, said aperture being elongated longitudinally of the lever for the reception and free vibrating movement therein of a tubular plunger-rod E, which extends through an oval hole in the lid B downwardly, and is secured in the dasher C at one side of its aperture, and so that the body of the dasher stands at an inclination thereto, the bore of the rod extending through the dasher. By placing the plunger-rod at the forward side of the dasher C, as shown, the central aperture $c$ is left unobstructed. The tubular plunger-rod E is open at the upper end, wherein a removable funnel F is inserted, the funnel and tube E having mating transverse perforations therein formed for the introduction of a connecting-pin $h$, which is inserted through aligning perforations formed transversely in the lever D opposite the elongated perforation $g$ of the lever. On the under side of the dasher C a flap-valve $i$ is attached by one edge, so that its main portion will cover and normally close the lower end of the tubular plunger-rod E, which valve should be of such sufficiently-rigid material as to remain in closed adjustment and retain water in the hollow rod, if it is poured into it through the funnel F, until a concussion of the rod and attached dasher is produced by means which will be described. Two or more sets of perforations are made in the upper portion of the rod E at short intervals of length, so that the vertical movement of the dasher C may be changed, if desired. A buffer-block k of a slightly-elastic material is provided, which is secured on the upper edge of the churn-body directly below the lever D, which block is adapted to receive the impact of the downwardly-moving lever and determine its downward stroke, the sudden arrest of the lever producing a rebounding action that is communicated to the dasher C and valve i.

On the rear end of the lever D a projecting arm m is secured, to which the upper end of the strong spiral spring G is loosely attached, a similar arm m' being extended from the bottom wall of the churn-body A, to which the lower end of the spring G is secured.

At the front and near the bottom the side wall of the churn-body A is perforated for the insertion of a spigot I, which is preferably screwed therein, and over the aperture made for the spigot a fine screen n is secured, which is of such a mesh as will allow milk to flow from the chamber A' through the screen and restrain granular butter formations that pervade the buttermilk while the butter is forming, and after the churning is completed.

Through the center of the lid B a thermometer J is inserted, which is enveloped by a tubular case, whereby the device may be retained immersed in the cream during the churning process, and to facilitate its removal a knob o is formed on or secured to the upper end of the thermometer-case, which may be gripped and the entire instrument elevated when necessary.

In operation, the churn-body receives a proper quantity of cream, and, if necessary, a suitable amount of warm or cold water, the lid being fastened in place by the turn-buttons p, that are located oppositely, one being shown in Fig. 2. After the material is within the churn the lever D is reciprocated, said operation being facilitated by the coaction of the spring G.

In the churning of butter it is well known to those skilled in its manufacture that a percussive agitation of the cream will break the globules or butter sacks and release the butter granules more quickly than any other process. Furthermore, the introduction of warm or cold water to bring the cream to a proper temperature greatly facilitates the rapid and complete release of butyric oil from the inclosing sacks. The peculiar construction of the dasher C permits the suspension of a thermometer J in the churn-box near its center, so that it will reach nearly to the bottom of the receptacle named, and at any time by its removal indicate the exact temperature of the cream within.

In operation, the cream being placed within the churn-body A and the lid B replaced, with the thermometer J in position in the aperture c of the dasher C, a vibration of the lever D will, if forcibly effected, cause it to strike upon the buffer-block k, so as to rebound. The dasher C, being then below the cream, is made to strike upon it with violence and cause a percussion of the entire surface of the liquid mass thus struck. The sudden arrest of the lever D by its impact upon the block k will jar the valve i, so as to cause it to fly open and thus permit any water which may have been introduced within the tubular rod E to escape below the cream and be quickly mixed therewith by the action of the dasher C. The jarring of the mass of cream by repeated strokes of the dasher will speedily break up the sacks holding the butyric oil and release the butter, which will then form into larger granules by concretion, which will result in a mass of butter quickly produced, if the proper conditions of temperature and manipulation are maintained.

Having thus fully described my invention, I claim as new and desire to secure by Letters Patent—

1. In a churn, a cream-chamber having its lid apertured to receive a thermometer which hangs pendent therein, and a centrally-apertured churn-dasher which is adapted to reciprocate vertically in the cream-chamber and by provision of its central aperture avoid contact with the thermometer, substantially as described.

2. A churn having a cream-chamber, a lid, a vertically-reciprocating dasher within, a tubular plunger-rod secured by its lower end to the dasher and provided with a normally-closed flap-valve on said lower end, a normally-horizontal vibratory lever through which the plunger-rod extends and to which it is pivoted, a funnel on the upper end of the plunger-rod above its point of connection with the lever, and a percussion-block on the cream-chamber which will receive the impact of the lever, substantially as described.

3. A churn having the following elements, viz: a cream-chamber, a lid, an upwardly-dished dasher centrally apertured and radially slotted, a tubular plunger-rod affixed near one edge of the dasher, a flap-valve on the lower end of the plunger which opens by percussion, a spring-supported lever, and a slightly elastic buffer-block whereon the lever will strike when vibrated.

JOHN FRANKLIN ADAMS.

Witnesses:
ARTHUR H. GILMORE,
A. L. CRAIG.